(12) United States Patent
 Fujiwara

(10) Patent No.: US 8,837,002 B2
(45) Date of Patent: Sep. 16, 2014

(54) IMAGE FORMING APPARATUS PERFORMING IMAGE FORMING BY SUPERIMPOSING IMAGES OF AT LEAST TWO COLORS, IMAGE FORMING SYSTEM, AND COLOR SHIFT CORRECTION METHOD

(71) Applicant: Kyocera Document Solutions Inc., Osaka (JP)

(72) Inventor: Daisuke Fujiwara, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/946,596

(22) Filed: Jul. 19, 2013

(65) Prior Publication Data
US 2014/0022602 A1    Jan. 23, 2014

(30) Foreign Application Priority Data
Jul. 20, 2012 (JP) ................................. 2012-161277

(51) Int. Cl.
 *G06T 5/00* (2006.01)
 *H04N 1/00* (2006.01)
 *G03G 15/01* (2006.01)
 *G03G 15/00* (2006.01)
(52) U.S. Cl.
 CPC . *H04N 1/00023* (2013.01); *G03G 2215/00569* (2013.01); *G03G 2215/0161* (2013.01); *G03G 15/0194* (2013.01); *H04N 1/00005* (2013.01); *G03G 15/5062* (2013.01)

USPC ........................................... 358/3.26
(58) Field of Classification Search
 None
 See application file for complete search history.

(56) References Cited

U.S. PATENT DOCUMENTS

| 2005/0031361 | A1* | 2/2005 | Kobayashi | 399/49 |
| 2009/0141298 | A1* | 6/2009 | Kushida | 358/1.12 |
| 2011/0026044 | A1* | 2/2011 | Murayama | 358/1.5 |

FOREIGN PATENT DOCUMENTS

JP        2004157415        6/2004

* cited by examiner

*Primary Examiner* — Jeremiah Bryar
(74) *Attorney, Agent, or Firm* — K&L Gates LLP

(57) ABSTRACT

An image forming apparatus includes an image forming section, a chart creation section, an input section, and a color shift correction section. The image forming section includes a plurality of image forming units that individually form images of different colors. The chart creation section inputs, to the image forming section, the image data of a chart including first lines containing a reference color and a stepped image located between the first lines and that has second lines containing an adjustment color. The input section receives the input of an adjustment value selected based on a chart formed by the image forming section. In response to the adjustment value, the color shift correction section moves the image forming position of the image forming unit forming the image of the adjustment color with respect to the image forming position of the image forming unit forming the image of the reference color.

15 Claims, 18 Drawing Sheets

Related Art

IMAGE FORMING APPARATUS PERFORMING IMAGE FORMING BY SUPERIMPOSING IMAGES OF AT LEAST TWO COLORS, IMAGE FORMING SYSTEM, AND COLOR SHIFT CORRECTION METHOD

INCORPORATION BY REFERENCE

This application is based upon and claims the benefit of priority from corresponding Japanese Patent Application No. 2012-161277, filed on Jul. 20, 2012, the entire contents of which are incorporated herein by reference.

BACKGROUND

The present invention relates to an image forming apparatus performing image forming by superimposing images of at least two colors, an image forming system, and a color shift correction method.

In recent years, full-color compatible image forming apparatuses have been widely prevalent. An example of such a full-color compatible image forming apparatus is an apparatus that forms a color image by superimposing images (toner images) individually formed by individual colors of cyan (C), magenta (M), and yellow (Y). As one such image forming system, a tandem system that forms toner images of individual colors of cyan (C), magenta (M), yellow (Y), and black (K) using individual image forming units is known. In the tandem system, the image forming units of the individual colors of CMYK are arrayed in the moving direction of the transfer belt, the timings of the formation of the toner images of the individual image forming units are controlled so that the toner images formed in the individual image forming units are transferred to the same position in the transfer belt.

In this way, in an image forming apparatus where one image is formed by superimposing images individually formed with respect to individual colors, when a shift (a so-called color shift) occurs when the images of individual colors are superimposed, the quality of a formed image is significantly reduced. Examples of such a color shift include a color shift caused by: the images of individual colors being relatively shifted in a direction (a main scanning direction) perpendicular to the moving direction of the transfer belt; the images of the individual colors being relatively shifted in a direction (a sub-scanning direction) parallel to the moving direction of the transfer belt; by the widths (magnifications) of the images of the individual colors being different; and by scan lines in the main scanning direction used for forming the images of the individual colors being inclined.

For example, a color shift caused by a shift in the main scanning direction or a shift in the sub-scanning direction may be corrected by adjusting an image writing start timing via an exposure device in the main scanning direction or the sub-scanning direction. In addition, a color shift caused by a magnification may be corrected by adjusting the frequency of the clock signal used for image writing via the exposure device. Furthermore, the inclination of the scan line may be corrected by adjusting the attachment position of the exposure device or the image carrier.

Even if color shift correction was implemented at the time of factory shipment, when a member relating to image forming has been attached or removed after that, in some cases such a color shift as described above occurs owing to a subtle change in an attachment position or vibration at the time of an attachment operation. Therefore, in the situation where the detachment of a member relating to image forming was detected, color shift correction is implemented when the corresponding member has been attached.

In many cases, image forming apparatuses in recent years have been configured so as to automatically implement the above-mentioned color shift correction. However, members configuring the image forming units of the individual colors are not completely identical to one another, and have dimensional variations caused by process variations even if they are the same type of member. In addition, such a process variation also exists within the same member. Therefore, for example, in rotary members or the like such as photoreceptor drums configuring the image forming units of individual colors, technically the rotation radius of a rotating body is not uniform, or a rotational fluctuation occurs that is caused by a driving fluctuation in a drive system for the rotating body.

A minute variation such as the non-uniformity of the rotation radius, or rotational fluctuation, is inherent in the image forming unit of each color of CMYK, and occurs with having no correlation with the other image forming units. Therefore, even when the color shift correction has been automatically implemented, when taking into account two specified colors, in some cases a color shift has occurred the degree of which influences an image quality. In order to solve such a color shift, fine adjustments become necessary.

As a method for such fine adjustment, the image forming apparatus can be caused to output a chart for such fine adjustment, and color shift correction is subjected to the fine adjustment based on the output result of the corresponding chart. In this method, as illustrated in FIG. 12, as a chart 1200 for fine adjustment, image data is used where a pattern 1201 that includes a plurality of parallel lines including a reference color (for example, K) and having equal pitches and equal line widths and a pattern 1202 that includes a plurality of parallel lines including an adjustment color (for example, C) and having equal pitches and equal line widths are adjacent to each other. Here, the pitch of the parallel lines of the adjustment color is wider by one dot than the pitch of the parallel lines of the reference color, and the line widths of the parallel lines of the two colors are identical to each other.

The image forming apparatus is caused to output this chart for adjustment, a portion where the lines of the two colors coincide with each other is read, and the adjustment amount (an adjustment value) is decided based on the result thereof. For example, when the pitch of the parallel lines of the reference color is five dots, and the line width of each parallel line is one dot (the one dot is, for example, 1/600 inches square), the lines of two colors coincide with each other every six lines in the reference color. If the position where the lines of two colors coincide with each other is such a position as designed, no color shift occurs. On the other hand, if the position where the lines of two colors coincide with each other is different from the design position, a color shift occurs. For example, when, in the reference color, the position where the lines of two colors coincide with each other is shifted by two lines from the design position, the adjustment color generates a two-dot color shift with respect to the reference color.

However, in the above-mentioned chart for fine adjustment, as the print area of the chart for fine adjustment, used for obtaining the adjustment value, a relatively large area becomes necessary. For example, in the above-mentioned example, as the area for forming the parallel lines of the reference color, a width of about 30 mm becomes necessary. In other words, it is only possible to obtain one color shift adjustment amount from the width of about 30 mm.

As described above, since, in the image forming unit of each color of CMYK, the color shift occurs having no correlation with the other image forming units, the occurrence state of a color shift is different in the different position on a sheet of paper. In addition, even in the same position on a sheet of paper, for example, the occurrence state of a color shift between CK and the occurrence state of a color shift between MK are different from each other. Therefore, so as to execute the fine adjustment of color shift correction over the entire sheet of paper, it is desirable that the color shift adjustment value with respect to each adjustment color (for example, each of CMY) is acquired.

However, in the above-mentioned chart for fine adjustment, there has been a problem in that the number of charts locatable on a sheet of paper is limited due to the restriction of the size thereof and it is difficult to acquire adjustment values with respect to each adjustment color throughout the entire sheet of paper. In addition, even if a large number of charts for fine adjustment are locatable on a sheet of paper, there is a problem that, so as to acquire adjustment values, it is necessary to confirm the position where the lines of two colors coincide with each other in each chart for fine adjustment and the large amount of work is taken. Therefore, the above-mentioned method has not been more than satisfactory, as a fine adjustment method for color shift correction.

SUMMARY

An image forming apparatus according to an embodiment of the present disclosure includes an image forming section, a chart creation section, an input section, and a color shift correction section. The image forming section includes a plurality of image forming units that individually form images of different colors, and performs image forming by superimposing images of two colors that are individually formed by two of the image forming units. The chart creation section inputs, to the image forming section, the image data of a chart that includes first lines serving as a plurality of lines containing a reference color serving as one color of the two colors, the plural lines being located in parallel at specific intervals, and a stepped image that has second lines serving as a plurality of lines containing an adjustment color serving as the other color of the two colors, the plural lines being parallel to the first lines and having equal line widths, wherein between the first lines, equal line width portions in the individual second lines are located with the positions thereof shifted in order, so as to be headed from one of the first lines to the other in the stepped image. The input section receives the input of an adjustment value selected based on the chart formed by the image forming section. In response to the adjustment value input to the input section, the color shift correction section moves the image forming position of the image forming unit forming the image of the adjustment color in the image forming section with respect to the image forming position of the image forming unit forming the image of the reference color.

An image forming system according to an embodiment of the present disclosure includes an image forming apparatus and a chart creation apparatus. The image forming apparatus includes a plurality of image forming units that individually form images of different colors, and performs image forming by superimposing images of two colors that are individually formed by two of the image forming units. The chart creation apparatus inputs, to the image forming apparatus, the image data of a chart that includes first lines serving as a plurality of lines containing a reference color serving as one color of the two colors, and a stepped image that has second lines serving as a plurality of lines containing an adjustment color serving as the other color of the two colors, the plural lines being parallel to the first lines and having equal line widths, wherein between the first lines, equal line width portions in the individual second lines are located with the positions thereof shifted in order, so as to be headed from one of the first lines to the other in the stepped image. In addition, the image forming apparatus includes an image forming section, an input section, and a color shift correction section. The image forming section performs the image forming. The input section receives the input of an adjustment value selected based on the chart formed by the image forming section. In response to the adjustment value input to the input section, the color shift correction section moves the image forming position of the image forming unit forming the image of the adjustment color in the image forming section with respect to the image forming position of the image forming unit forming the image of the reference color.

A color shift correction method according to an embodiment of the present disclosure includes performing image forming, inputting image data, receiving an input, and moving an image forming position. The performing image forming includes performing image forming by superimposing images of two colors that are individually formed by two of a plurality of image forming units, in an image forming section configured to include the image forming units that individually form images of different colors. The inputting image data includes inputting, to the image forming section, the image data of a chart that includes first lines serving as a plurality of lines containing a reference color serving as one color of the two colors, the plural lines being located in parallel at specific intervals, and a stepped image that has second lines serving as a plurality of lines containing an adjustment color serving as the other color of the two colors, the plural lines being parallel to the first lines and having equal line widths, wherein between the first lines, equal line width portions in the individual second lines are located with the positions thereof shifted in order, so as to be headed from one of the first lines to the other in the stepped image. The receiving an input includes receiving the input of an adjustment value selected based on the chart formed by the image forming section. The moving an image forming position includes moving, in response to the input adjustment value, the image forming position of the image forming unit forming an image of the adjustment color in the image forming section with respect to the image forming position of the image forming unit forming an image of the reference color.

Additional features and advantages are described herein, and will be apparent from the following Detailed Description and the figures.

DETAILED DESCRIPTION

Reference will now be made in detail to various embodiments of the disclosure, one or more examples of which are illustrated in the accompanying drawings. Each example is provided by way of explanation of the disclosure, and by no way limiting the present disclosure. In fact, it will be apparent to those skilled in the art that various modifications, combinations, additions, deletions and variations can be made in the present disclosure without departing from the intended scope or spirit. Features illustrated or described as part of one embodiment can be used in another embodiment to yield a still further embodiment. It is intended that the present disclosure cover such modifications, combinations, additions, deletions, applications and variations that come within the scope of the appended claims and their equivalents.

Hereinafter, an embodiment of the present disclosure will be described in detail with reference to drawings. Hereinafter, the present disclosure will be embodied as a digital multi-function machine.

Figure 1:
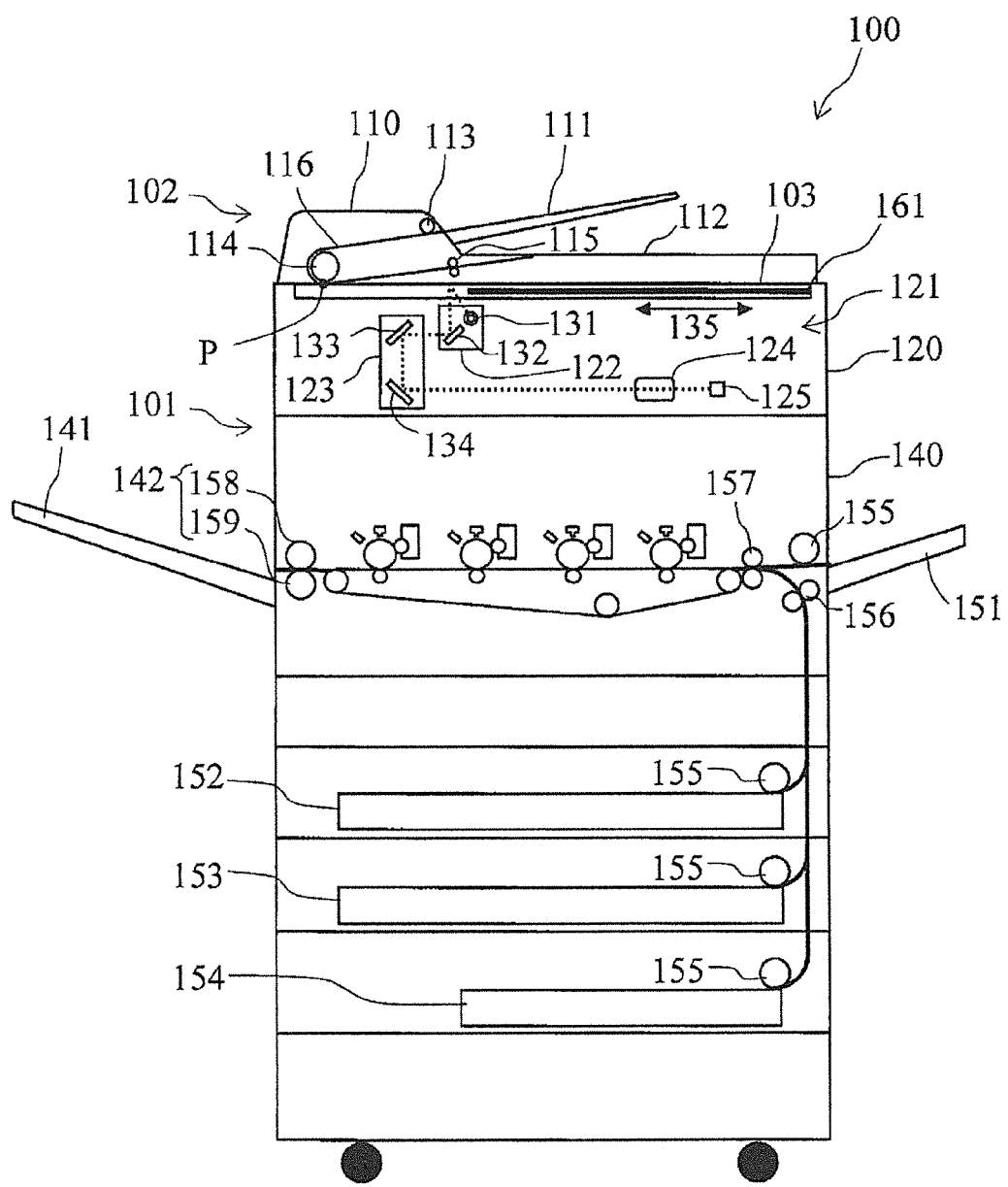
FIG. 1 is a schematic configuration diagram illustrating an entire configuration of a multifunction machine in an embodiment of the present disclosure.

FIG. 1 is a schematic configuration diagram illustrating an example of the entire configuration of a digital multifunction machine in the present embodiment. As illustrated in FIG. 1, a multifunction machine 100 includes a main body 101 including an image reading unit 120 and an image forming section 140 and a platen cover 102 attached above the main body 101. In the top surface of the main body 101, a platen 103 is provided that includes a transparent plate such as a contact glass, and the platen 103 is opened and closed by the platen cover 102. In addition, the platen cover 102 includes a document transport device 110.

The image reading unit 120 is provided below the platen 103. The image reading unit 120 reads the image of a document using a scanning optical system 121, and generates the digital data (image data) of the image. Image processing designated as appropriate is performed on the image data. The document may be set on the platen 103. The scanning optical system 121 includes a first carriage 122, a second carriage 123, and a condensing lens 124. A linear light source 131 and a mirror 132 are located in the first carriage 122, and mirrors 133 and 134 are located in the second carriage 123. The light source 131 illuminates the document. The mirrors 132, 133, and 134 conduct reflected light from the document to the condensing lens 124, and the condensing lens 124 forms an image in the light receiving surface of a line image sensor 125. In this scanning optical system 121, the first carriage 122 and the second carriage 123 are positioned so as to be reciprocable in a sub-scanning direction 135. By moving the first carriage 122 and the second carriage 123 in the sub-scanning direction 135, it is possible to read the image of the document set on the platen 103 using the image sensor 125. Based on the received light, the image sensor 125 generates, for example, image data corresponding to each of the colors of red (R), green (G), and blue (B).

In addition, the document may also be set on a document tray 111. Using a pickup roller 113, a document transport device 110 sends the document set in the document tray 111 to a transport path 116, one at a time. An image reading position P exists on the transport path 116. A transport roller 114 transports the document to the image reading position P. When the image of the document set in the document tray 111 is read, the image reading unit 120 moves and temporarily fixes the first carriage 122 and the second carriage 123 to the image reading position P. When the document passes through the image reading position P, the light source 131 illuminates the document. Light from the source 131 penetrates the platen 103, is reflected from the document passing through the image reading position P, and conducted to the image sensor 125 owing to the mirrors 132, 133, and 134 and the condensing lens 124. The document having passed through the image reading position P is ejected to a paper ejection tray 112 owing to a paper ejection roller 115.

The image forming section 140 prints, on paper, image data obtained in the image reading unit 120 or image data received from another apparatus (not illustrated) connected to a network or the like through a network interface.

Figure 2:
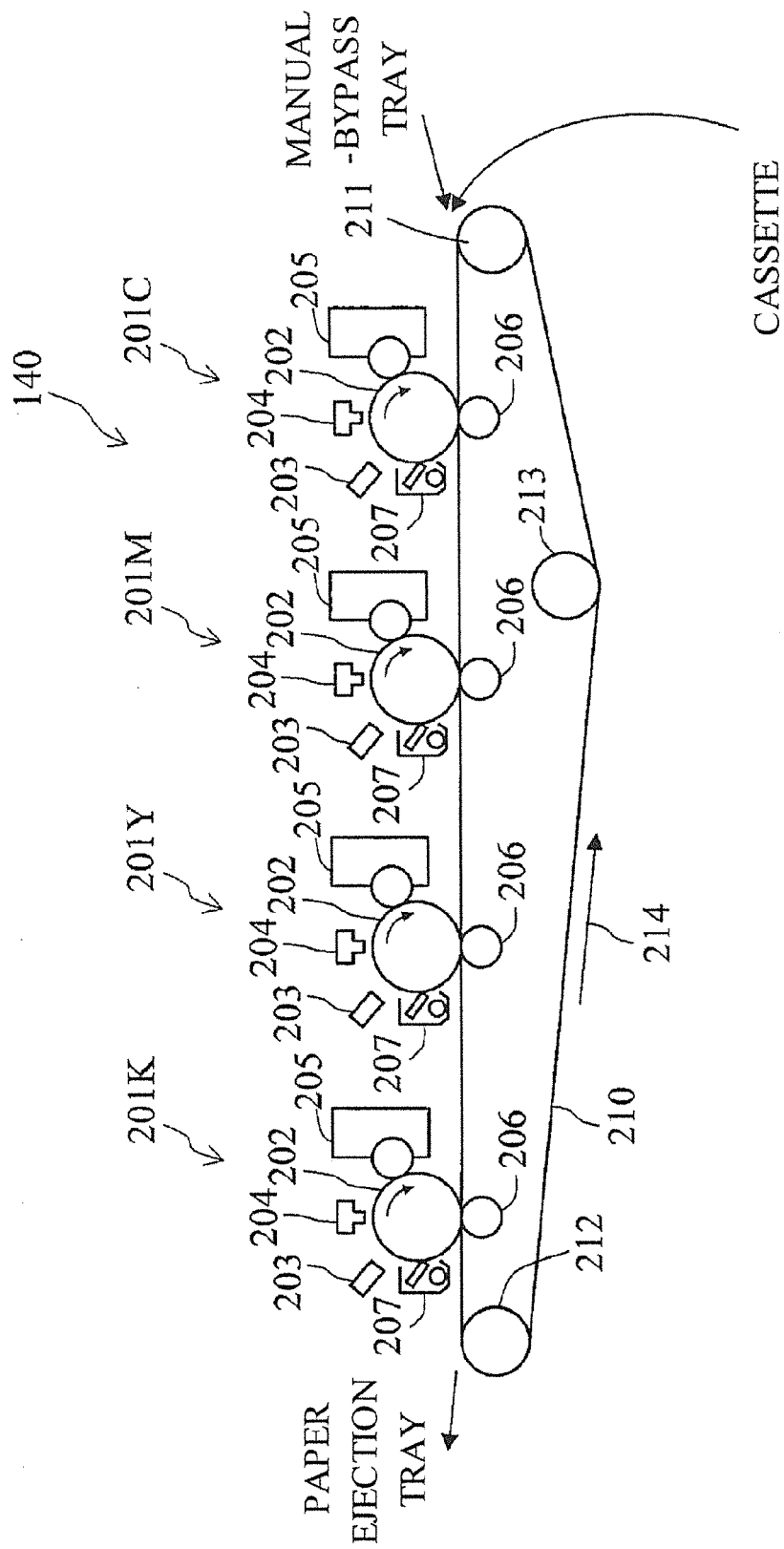
FIG. 2 is a schematic configuration diagram illustrating a configuration of an image forming section in a multifunction machine in an embodiment of the present disclosure.

FIG. 2 is a schematic configuration diagram illustrating an example of the configuration of the image forming section 140. The image forming section 140 is a so-called tandem system. As illustrated in FIG. 2, the image forming section 140 includes an endless transfer belt 210 and image forming units 201C, 201M, 201Y, and 201K that are positioned along the transfer belt 210 and individually form the toner images of the individual colors of CMYK. The transfer belt 210 is wound around a driving roller 211, a driven roller 212, and a tension roller 213. The tension roller 213 is biased from the inside of the transfer belt 210 to the outside thereof, and applies tension to the transfer belt 210. The transfer belt 210 rotates in the direction of an arrow 214 due to the driving roller 211.

Each of the image forming units 201C, 201M, 201Y, and 201K includes a photoreceptor drum 202 serving as an image carrier. The photoreceptor drum 202 rotates in one direction at a given velocity. Around the photoreceptor drum 202, a charging device 203, an exposure device 204, a development device 205, a transfer roller 206, a cleaning device 207, and the like are positioned in order starting from the upstream side of a rotation direction. The charging device 203 uniformly charges the surface of the photoreceptor drum 202. The exposure device 204 irradiates the uniformly charged surface of the photoreceptor drum 202 with light based on the image data, and forms an electrostatic latent image on the photoreceptor drum 202. The development device 205 causes toner to adhere to that electrostatic latent image, and forms a toner image on the photoreceptor drum 202. The transfer roller 206 transfers the toner image on the photoreceptor drum 202 to the transfer belt 210. The cleaning device 207 strips off toner remaining on the surface of the photoreceptor drum 202 after transfer via the transfer roller 206.

While not specifically limited, in an embodiment, the image forming units 201C, 201M, 201Y, and 201K are located in an order of: the image forming unit 201C, the image forming unit 201M, the image forming unit 201Y, and the image forming unit 201K, starting from the upstream side of the circling direction of the transfer belt 210. Each image forming unit transfers the toner image of each color to a sheet of paper (a transfer receiving body) transported on the transfer belt 210 in this order. By controlling the timing when the toner image of each color is transferred, the toner image of each color is sequentially superimposed on a sheet of paper transported by the transfer belt 210. As a result, a color toner image is formed on a sheet of paper. In addition, a color image of an RGB format is converted into image data of a CMYK format, and pieces of image data of the individual colors are individually input to the exposure devices 204 in the image forming units 201C, 201M, 201Y, and 201K.

The image forming section 140 feeds a sheet of paper to a transfer section between the photoreceptor drum 202 and the transfer roller 206 from a manual-bypass tray 151, paper feeding cassettes 152, 153, and 154, or the like (refer to FIG. 1). Sheets of paper having various sizes may be set on or housed in the manual-bypass tray 151, or each of the paper feeding cassettes 152, 153, and 154. The image forming section 140 selects a sheet of paper designated, by a user or a sheet of paper according to an automatically detected size of a document, and removes the selected sheet of paper from the manual-bypass tray 151, or the cassettes 152, 153, and 154, using the feeding roller 155. The sheet of paper is sent to the transfer section via a transport roller 156 and a resist roller 157. The sheet of paper, to which the toner image has been transferred, is transported to a fixation device 142. The fixation device 142 includes a fixation roller 158 embedded with a heater and a pressure roller 159, and fixes the toner image to the sheet of paper using heat and pressure. The image forming section 140 ejects the sheet of paper, having passed through the fixation device 142, to a paper ejection tray 141.

Figure 3:
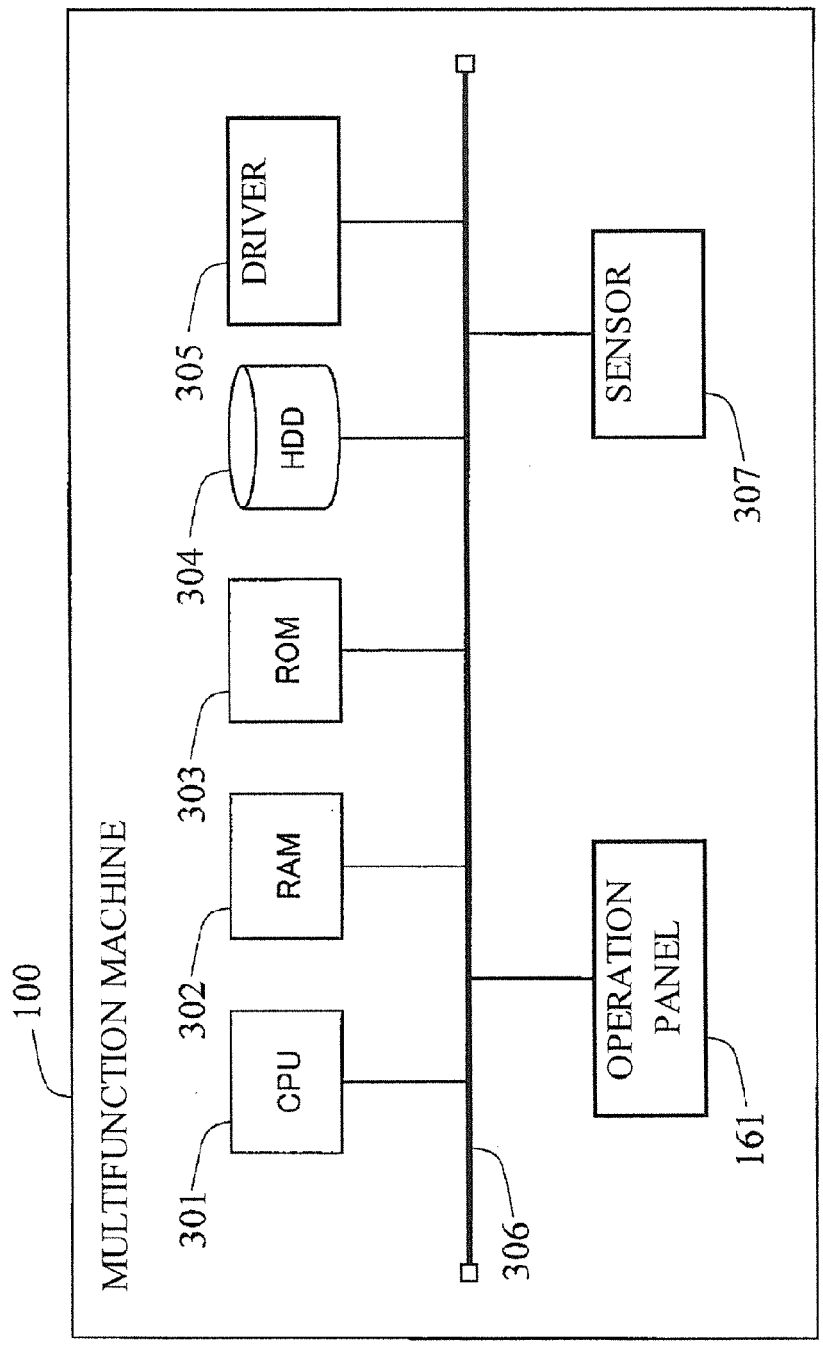
FIG. 3 is a diagram illustrating a hardware configuration of a multifunction machine in an embodiment of the present disclosure.

FIG. 3 is the hardware configuration diagram of a control system in a multifunction machine. In the multifunction machine 100 of the present embodiment, a central processing unit (CPU) 301, a random access memory (RAM) 302, a read only memory (ROM) 303, a hard disk drive (HDD) 304, and a driver 305 corresponding to each drive unit in the document transport device 110, the image reading unit 120, and the image forming section 140 are connected through an internal bus 306. The ROM 303, the HDD 304, and the like store therein programs, and the CPU 301 controls the multifunction machine 100 based on instructions from the control program. For example, the CPU 301 uses the RAM 302 as a working area, and controls the operation of each of the above-mentioned drive units by transmitting and receiving data and an instruction to and from the driver 305. In addition, the HDD 304 is also used to store image data obtained from the image reading unit 120 or image data received from another apparatus through a network or the like.

An operation panel 161 and various kinds of sensors 307 are also connected to the internal bus 306. As illustrated in FIG. 1, the operation panel 161 is located on the front surface of the upper portion of the main body 101, receives an operation of a user, and supplies, to the CPU 301, a signal based on the operation. In addition, based on a control signal from the CPU 301, the operation panel 161 displays an operation screen used by the user for inputting an instruction. The sensors 307 include various kinds of sensors such as a detection sensor for the opening and closing of the platen cover 102, a detection sensor for a document on the platen 103, a temperature sensor for the fixation device 142, and a detection sensor for a sheet of paper or a document transported. By executing, for example, a program stored in the ROM 303, the CPU 301 implements the following individual sections (functional blocks), and controls the operations of the individual sections in response to signals from these sensors.

Figure 4:
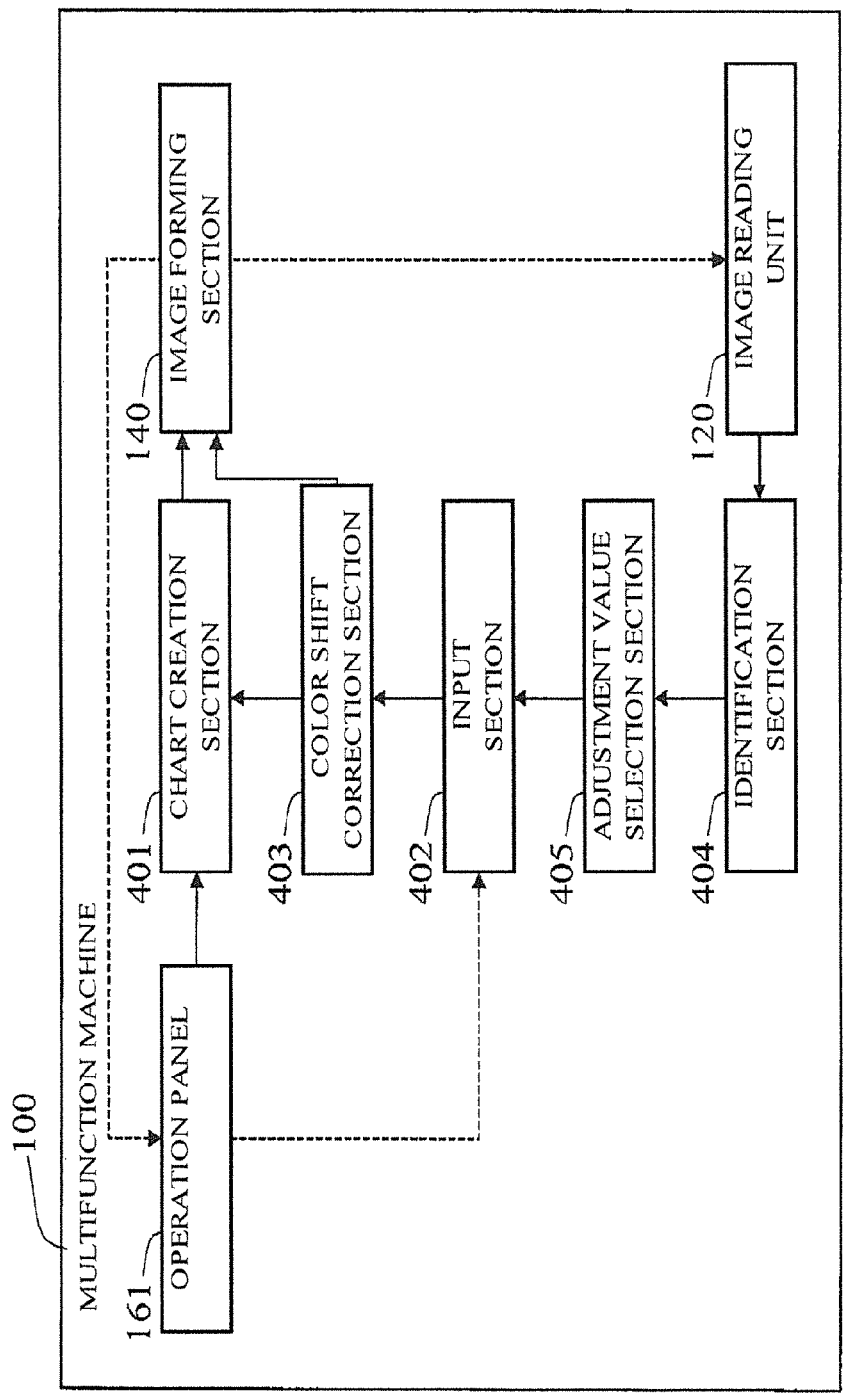
FIG. 4 is a functional block diagram illustrating a multifunction machine in an embodiment of the present disclosure.

FIG. 4 is the functional block diagram of a multifunction machine of an embodiment. As illustrated in FIG. 4, the multifunction machine 100 in an embodiment includes a chart creation section 401, an input section 402, and a color shift correction section 403.

Figure 5:
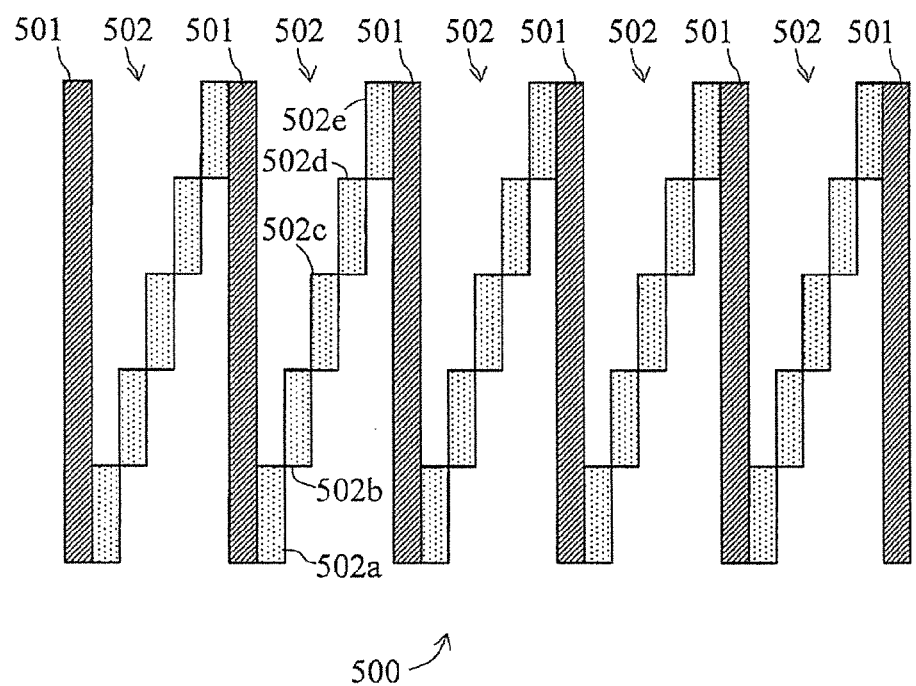
FIG. 5 is a diagram schematically illustrating a chart in an embodiment of the present disclosure.

The chart creation section 401 inputs, to the image forming section 140, the image data of a chart used for acquiring the adjustment value of color shift correction. FIG. 5 is a diagram illustrating an example of image data of a chart in an embodiment. This chart is used for detecting a shift of an adjustment color serving as another color, with respect to a reference color that is a color serving as a reference. For example, as described above, in the multifunction machine 100 including the image forming units for the four colors of CMYK, the K is defined as a reference color, the other CMY are defined as adjustment colors, and fine adjustment is performed that causes the images of the individual adjustment colors to match the image of the reference color.

As illustrated in FIG. 5, the image data 500 of a chart for the fine adjustment of color shift correction in an embodiment includes a plurality of lines 501 containing the reference color and stepped images 502 containing the adjustment color. The plural lines 501 containing the reference color are located in parallel at specific intervals. In addition, the stepped image 502 includes a plurality of lines 502a, 502b, 502c, 502d, and 502e that are parallel to lines 501 containing the reference color, contain the adjustment color, and have equal line widths, and in the stepped image 502, between the parallel lines 501 containing the reference color, equal line width portions in the individual lines 502a to 502e containing the corresponding adjustment color are located with the positions thereof shifted in order, so as to be headed from one of the corresponding parallel lines 501 to the other.

In this example, the plural lines 501 containing the reference color have line widths of one dot, and are configured with a six-dot pitch. In other words, a distance between the line 501 containing the reference color and the line 501 that is adjacent to the corresponding line 501 and contains the reference color is five dots. In addition, here, the one dot represents an area of $\frac{1}{600}$ inches square.

In addition, the line width of each line containing the adjustment color is one dot equal to that of the line 501 containing the reference color, and when the above-mentioned disposition is adopted, the five lines 502a to 502e containing the adjustment color turn out to be located between the lines 501 adjacent to each other. In addition, the length of each of the lines 502a to 502e in the direction along the line 501 may be set to about 3 to 4 mm. In this case, the length of the line 501 is 15 to 20 mm.

When the chart creation section 401 has inputted the corresponding image data to the image forming section 140, the image forming section 140 forms, on a sheet of paper, an image according to the corresponding input. As described later, in an embodiment, the chart creation section 401 inputs, to the image forming section 140, image data used for forming, on one sheet of paper, the above-mentioned chart configured using the reference color K and the adjustment color C, the above-mentioned chart configured using the reference color K and the adjustment color M, and the above-mentioned chart configured using the reference color K and the adjustment color Y.

In addition, the chart creation section 401 inputs the image data of a chart to the image forming section 140 in response to an instruction from an operator. The corresponding instruction may be inputted through the operation panel 161. In addition, the chart creation section 401 may also have a configuration where the image data of the above-mentioned chart is preliminarily held, and may also have a configuration where the image data of the above-mentioned chart is created based on the condition input (a pitch or a line width) of the operator.

The input section 402 receives the input of an adjustment value selected based on the chart formed by the image forming section 140. For example, the operator having inputted an output instruction for a chart may read an adjustment value from an output chart and input the read adjustment value to the input section 402 through the operation panel 161. In addition, in this multifunction machine 100, as described later, the selection of the adjustment value may also be automatically implemented.

Based on the adjustment value inputted to the input section 402, the color shift correction section 403 moves the image forming position of the image forming unit forming the image of the adjustment color in the image forming section 140, with respect to the image forming position of the image forming unit forming the image of the reference color. For example, when the reference color is the K and the adjustment color is the C, and the adjustment value is "−1 dot", the color shift correction section 403 moves the image forming position of the image forming unit 201C by "−1 dot", with respect to the image forming position of the image forming unit 201K. The movement of the corresponding image forming position may be performed using a well-known arbitrary method. For example, the movement of the corresponding image forming position may be performed by adjusting image writing start timing via the exposure device 204 in the image forming unit 201C.

In addition, the multifunction machine 100 includes an identification section 404 and an adjustment value selection section 405. The identification section 404 identifies the state of the adjustment color in the image data of a chart generated by the image reading unit 120 reading the chart formed by the image forming section 140. The identification of the state of the adjustment color means that, in the stepped image 502, a position is identified where the adjustment color most clearly emerges. Such a position may be identified based on the intensity of the adjustment color or the gradations of the adjustment color. While not specifically limited, in an embodiment, the tone of the adjustment color is extracted, and a position where the tone of the adjustment color is maximum between the line 501 containing the reference color and the line 501 adjacent to the corresponding line 501 is identified as a position where the adjustment color most clearly emerges.

Based on an identification result via the identification section 404, the adjustment value selection section 405 selects the adjustment value to be inputted to the input section 402. While not specifically limited, in the present embodiment, the identification section 404 identifies the states of the adjustment color in a plurality of positions (a plurality of the stepped images 502) different from one another in the image data of a chart generated by the image reading unit 120, and the adjustment value selection section 405 inputs, as the above-mentioned adjustment value, the average value of the individual adjustment values selected based on the identification result of the plural positions identified by the identification section 404, to the input section 402.

Figure 6:
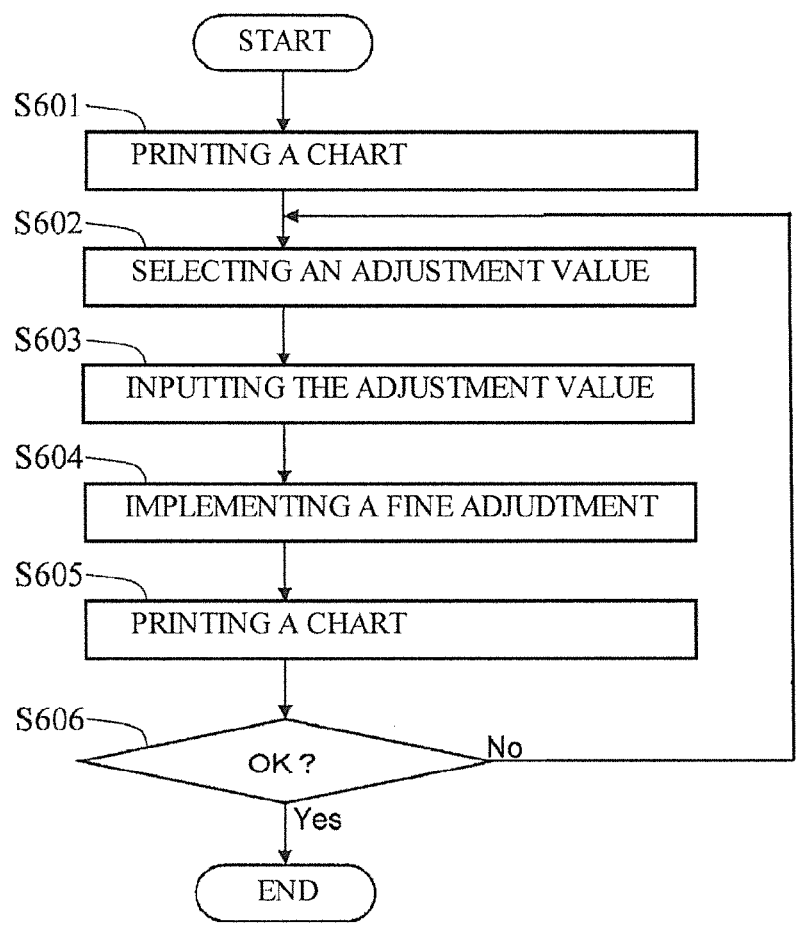
FIG. 6 is a flow diagram illustrating an example of a fine adjustment procedure for color shift correction a multifunction machine implements in an embodiment of the present disclosure.

FIG. 6 is a flow diagram illustrating an example of a fine adjustment procedure for color shift correction executed by the multifunction machine 100. The corresponding procedure is started with the input of a chart output instruction via the operator serving as a trigger.

When the operator has inputted the chart output instruction to the multifunction machine 100, the chart creation section 401 inputs the image data of the above-mentioned chart to the image forming section 140. Based on the corresponding input, the image forming section 140 prints the input image data (step S601).

Figure 7:
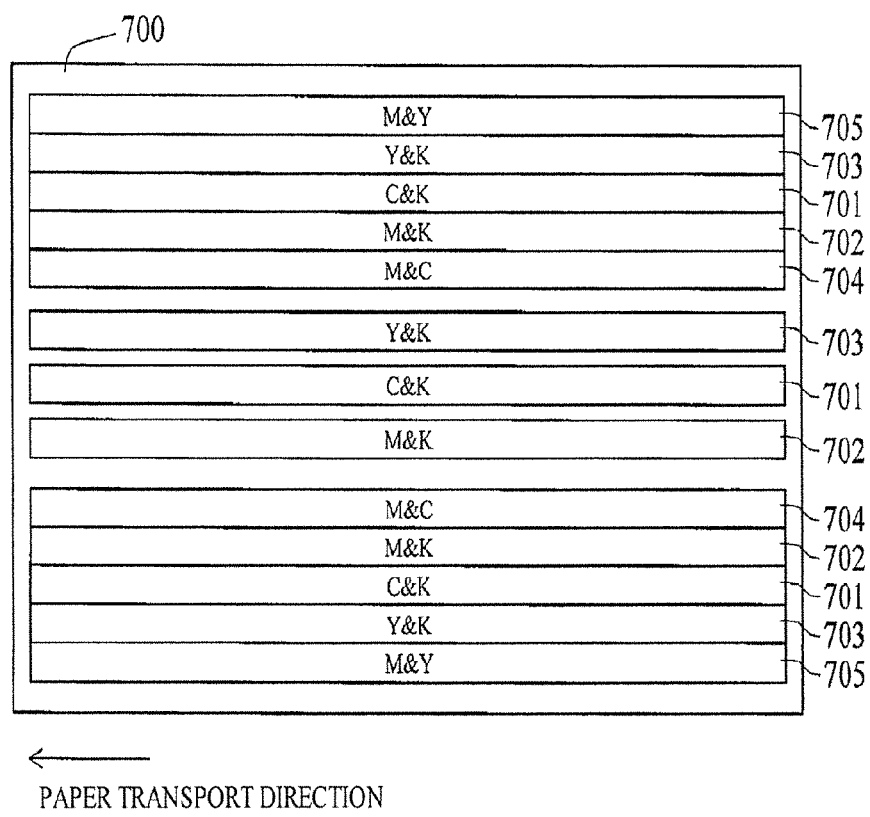
FIG. 7 is a diagram illustrating an example of a chart in an embodiment of the present disclosure.

FIG. 7 is a pattern diagram illustrating the layout of image data the chart creation section 401 inputs to the image forming section 140 in an embodiment. In this example, a layout is illustrated that is aimed at the fine adjustment of color shift correction in the sub-scanning direction (a direction parallel to a paper transport direction) where the influence of a minute variation such as the non-uniformity of the rotation radius or the rotational fluctuation of the photoreceptor drum 202 remarkably emerges.

As illustrated in FIG. 7, on a sheet of paper 700, a plurality of charts 701 to 705 extending in the sub-scanning direction are located. The chart 701 is a chart where the reference color is the K and the adjustment color is the C, and the lines 501 containing the reference color are located in the main scanning direction (a direction perpendicular to the paper transport direction). In the same way, the chart 702 is a chart where the reference color is the K and the adjustment color is the M, and the chart 703 is a chart where the reference color is the K and the adjustment color is the Y.

In addition, in the chart illustrated in FIG. 5, the chart 704 is a chart where a pattern corresponding to the reference color K is formed using the C and a pattern corresponding to the adjustment color is formed using the M, and the chart 705 is a chart where a pattern corresponding to the reference color K is formed using the Y and a pattern corresponding to the adjustment color is formed using the M. In an embodiment, the color shift correction is performed with the K as the reference color, and the chart 704 and the chart 705 utilizing the two colors serving as the adjustment colors are not involved directly in the fine adjustment of the color shift correction. However, it may be considered that, as the fine adjustment result of the color shift correction, a color shift between the adjustment colors becomes large. Therefore, in an embodiment, so as to confirm a color shift between the adjustment colors, the chart 704 and the chart 705 are formed on the paper in addition to the charts 701 to 703 used for the fine adjustment of the color shift correction.

When printing of the charts 701 to 705 via the image forming section 140 has been completed, the operator selects an adjustment value based on the output charts (step S602).

Figure 8A:
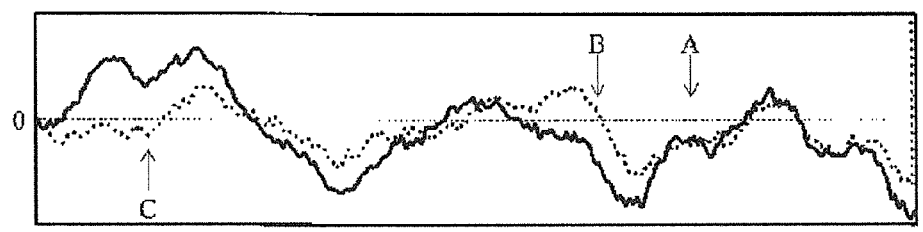
FIGS. 8A to 8C are diagrams illustrating examples of a color shift in a multifunction machine in an embodiment of the present disclosure.
Figure 8B:
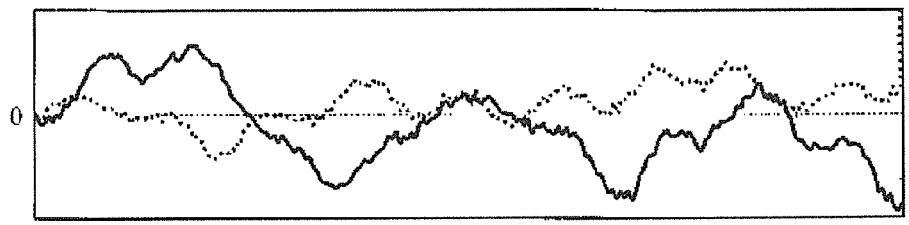
Figure 8C:
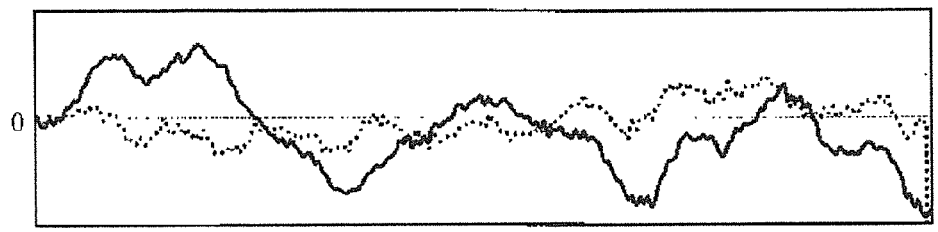

FIGS. 8A to 8C are diagrams illustrating states subjected to no fine adjustment, namely, the states of the absolute color shift of the multifunction machine 100 in a state where color shift correction has been automatically performed using a well-known method. In FIGS. 8A to 8C, horizontal axes correspond to positions on a sheet of paper in the paper transport direction, and vertical axes correspond to shift amounts from the design positions of images formed in individual positions. An upper side located above "0" assigned to the vertical axis indicates that a shift in the front end direction of the paper transport direction of the paper occurs, compared with the design position, and a lower side located below "0" indicates that a shift in the rear end direction of the paper transport direction of the paper occurs, compared with the design position.

FIG. 8A illustrates the state of a color shift between the reference color K and the adjustment color C, FIG. 8B illustrates the state of a color shift between the reference color K and the adjustment color M, and FIG. 8C illustrates the state of a color shift between the reference color K and the adjustment color Y. In FIGS. 8A to 8C, solid lines correspond to the data of the reference color K, and dotted lines correspond to the data of the adjustment color. In FIGS. 8A to 8C, a case where the solid line and the dotted line overlap with each other means that no color shift occurs. In addition, a case where the solid line is located above the dotted line means that the adjustment color is shifted in the rear end direction of the paper transport direction of the paper with respect to the reference color K. In the same way, a case where the dotted line is located above the solid line means that the adjustment color is shifted in the front end direction of the paper transport direction of the paper with respect to the reference color K. From FIGS. 8A to 8C, it may be understood that color shifts between the reference color K and the individual adjustment colors occur in the individual colors with having no correlation with one another.

Figure 9A:
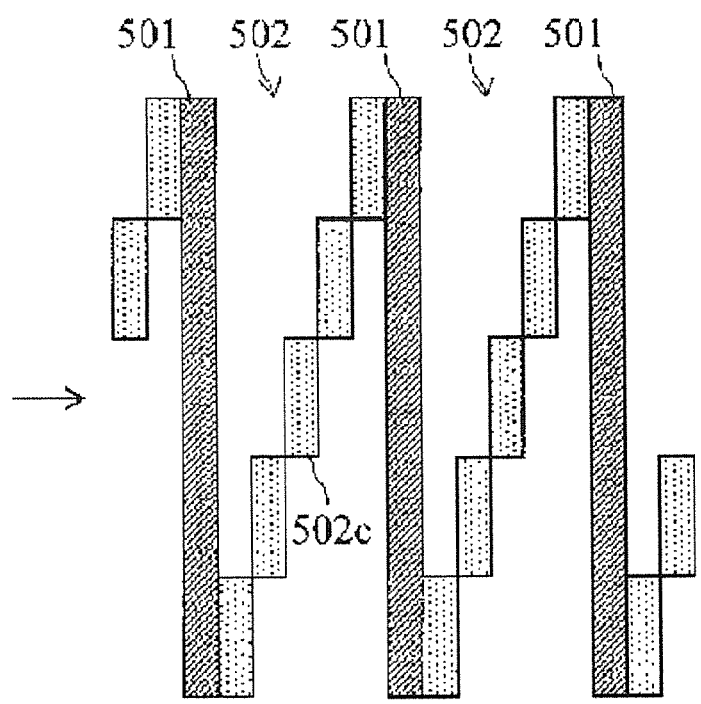
FIGS. 9A to 9C are diagrams illustrating a relationship between a color shift in a multifunction machine in an embodiment of the present disclosure and a chart.
Figure 9B:
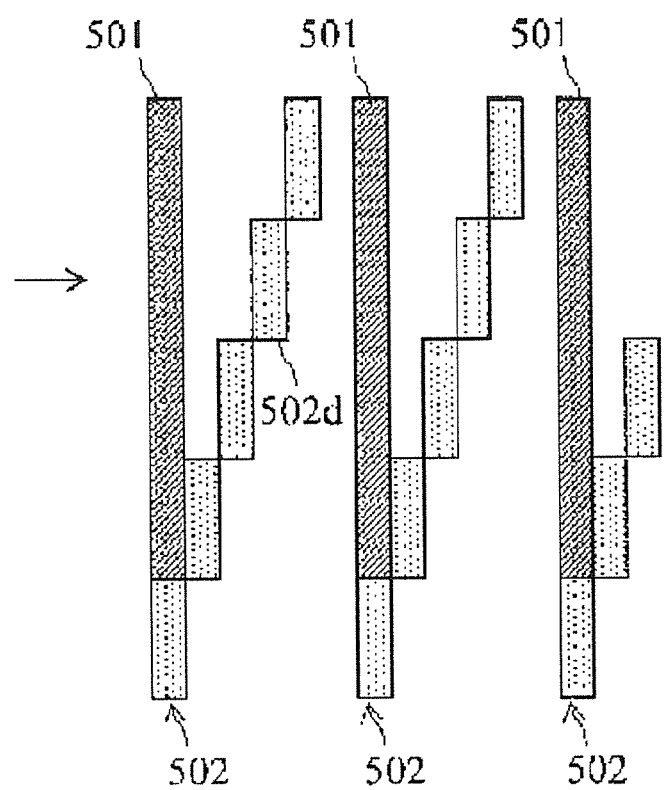
Figure 9C:
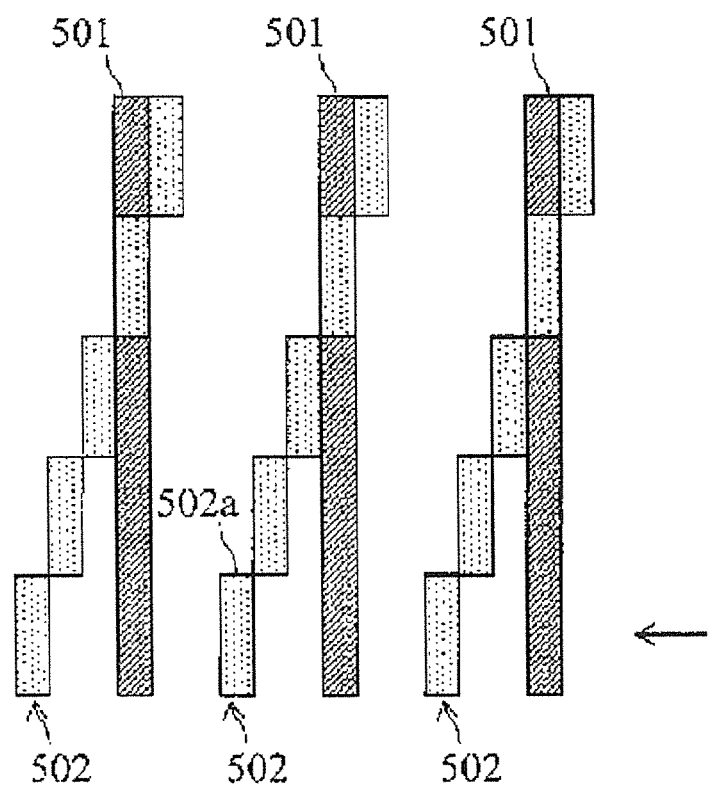

FIGS. 9A to 9C are diagrams used for explaining the relationship between a color shift and the state of the above-mentioned chart. When, as the arrow-indicated portion A illustrated in FIG. 8A, no color shift occurs, the stepped image 502 containing the adjustment color is formed between the lines 501 containing the reference color, as illustrated in FIG. 9A. In addition, when, as the arrow-indicated portion B illustrated in FIG. 8A, the adjustment color is shifted in the front end direction of the paper transport direction of the paper with respect to the reference color K, the stepped image 502 containing the adjustment color is shifted in the front end direction of the paper transport direction of the paper with respect to the line 501 containing the reference color, as illustrated in FIG. 9B. In addition, in the same way, when, as the arrow-indicated portion C illustrated in FIG. 8A, the adjustment color is shifted in the rear end direction of the paper transport direction of the paper with respect to the reference color K, the stepped image 502 containing the adjustment color is shifted in the rear end direction of the paper transport direction of the paper with respect to the line 501 containing the reference color, as illustrated in FIG. 9C.

Incidentally, in the chart for fine adjustment in an embodiment, since the stepped image 502 is formed between the lines 501 adjacent to each other, a moire phenomenon occurs, the adjustment color appears light in the portion where a blank between the reference color and the adjustment color is wide, and the adjustment color appears dark in the portion where a blank between the reference color and the adjustment color is narrow (in other words, in the situation where the line of the adjustment color is located in the center of a portion between the lines 501 of the reference color). For example, in FIG. 9A, the arrow-indicated line 502c third from the top of the stepped image 502 in the drawing appears darkest. In this situation, the fine adjustment amount of the color shift is zero dots. In addition, in FIG. 9B, the arrow-indicated line 502d second from the top of the stepped image 502 in the drawing appears darkest. In this situation, the fine adjustment amount of the color shift is one dot in the rear end direction of the paper. Furthermore, in FIG. 9C, the arrow-indicated line 502a first from the top of the stepped image 502 in the drawing appears darkest. In this situation, the fine adjustment amount of the color shift is two dots in the front end direction of the paper.

Therefore, according to the chart in an embodiment, in the stepped image 502 that contains the adjustment color and is located between the lines 501 containing the reference color, by identifying a position where the adjustment color is dark, it is possible to easily identify a color shift amount (an adjustment value) in that position. In addition, when, as illustrated in FIG. 7, a chart has been formed across the board in the sub-scanning direction, the portion where the adjustment color becomes dark is displaced in response to the color shift amount of each position (each stepped image 502) in each of the charts 701 to 703. Therefore, the displacement state is taken as a whole, and based on whether or not the stepped image 502 deviates to one end side of the line 501, it is possible to easily judge whether or not the fine adjustment is desired to be performed. In addition, when the stepped image 502 deviates to one end side of the line 501, it is also possible to visually decide a fine adjustment amount based on the deviation amount.

Since such a phenomenon as described above is an optical phenomenon, even if a printed chart is read by the image reading unit 120 to generate image data, the phenomenon appears in the image data. Therefore, by detecting the intensity (tone) of each adjustment color in each of the charts 701 to 703, it is possible to identify the position where the adjustment color is dark. In the multifunction machine 100 in an embodiment, the identification section 404 identifies the position where the adjustment color is dark in each of the stepped images 502 in the individual charts 701 to 703 within image data generated by the image reading unit 120. For example, in each stepped image 502, the identification section 404 identifies which of five levels from two dots in the front end direction of the paper to two dots in the rear end direction of the paper the position where the adjustment color is dark belongs to, as illustrated in FIGS. 9A to 9C, and in response to an identification result, the identification section 404 assigns the value (adjustment value) of +2, +1, 0, −1, or −2. In addition, the adjustment value selection section 405 selects the average value from the values the identification section 404 assigns, as an adjustment value to be input to the input section 402. In addition, the operator disposes a printed chart in the platen 103 or the document tray 111, and selects an image reading start key in the operation panel 161, and hence, the generation of the image data of the chart, performed by the image reading unit 120, may be implemented.

The adjustment value selected by the operator or the adjustment value selection section 405 in such a way as described above is inputted to the input section 402 (step S603). When the operator has visually selected the adjustment value, the corresponding adjustment value is inputted to the input section 402 through the operation panel 161.

The input section 402 to which the adjustment value has been inputted notifies the color shift correction section 403 of the corresponding adjustment value. The color shift correction section 403 having received the corresponding notification implements the fine adjustment of color shift correction on the image forming section 140 using the above-mentioned method (step S604).

The color shift correction section 403 having completed the fine adjustment notifies the chart creation section 401 to that effect. The chart creation section 401 inputs the image data of the above-mentioned chart to the image forming section 140 again. In response to the corresponding input, the image forming section 140 prints the input image data (step S605).

The operator refers to a printed chart, and confirms whether or not desired fine adjustment has been realized. In addition, when additional fine adjustment is desired to be performed, an adjustment value is selected using the above-mentioned method (step S606: No, S602). In addition, when additional fine adjustment is not desired to be performed, the procedure is terminated (step S606: Yes).

Figure 10A:
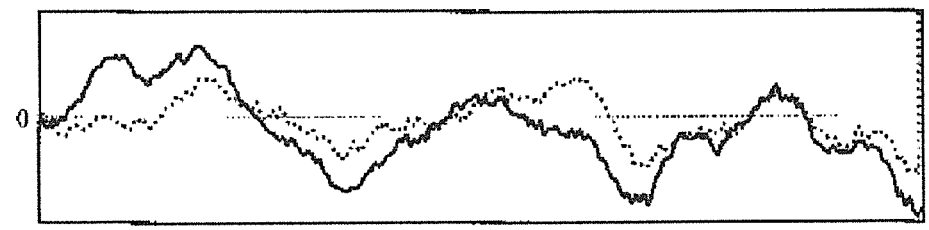
FIGS. 10A and 10B are diagrams illustrating examples of a color shift in a multifunction machine in an embodiment of the present disclosure.
Figure 10B:
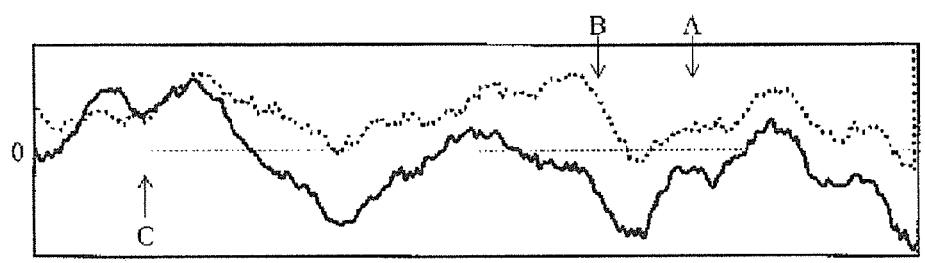

FIGS. 10A and 10B illustrate states where the above-mentioned fine adjustment has been implemented on the reference color K and the adjustment color C illustrated in FIG. 8A. As illustrated in FIG. 10A, as the result of the fine adjustment, the data of the adjustment color C indicated by a dotted line is shifted to the upper side in the drawing.

On the other hand, FIG. 10B illustrates the result when fine adjustment has been implemented using the data of the reference color K and the adjustment color C acquired in an arrow-indicated portion C. When the adjustment value acquired in a limited position is used, color shifts increase in arrow-indicated portions A and B, and when the sub-scanning direction is taken as a whole, it may be understood that adequate fine adjustment has not been performed.

On the other hand, in the method of an embodiment, since data in the entire sub-scanning direction is used and the chart itself is small, it is possible to obtain an adjustment value using data in many positions. As a result, it is possible to implement the fine adjustment of color shift correction with a higher degree of accuracy, and it becomes possible to realize high-quality image forming.

Figure 11A:
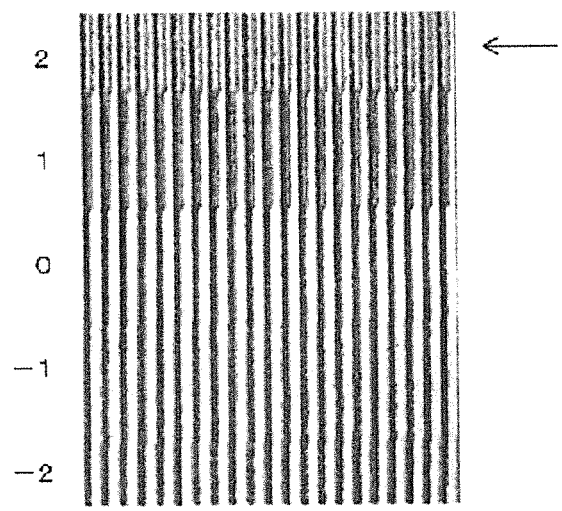
FIGS. 11A and 11B are diagrams illustrating examples of a chart a multifunction machine forms in an embodiment of the present disclosure.
Figure 11B:
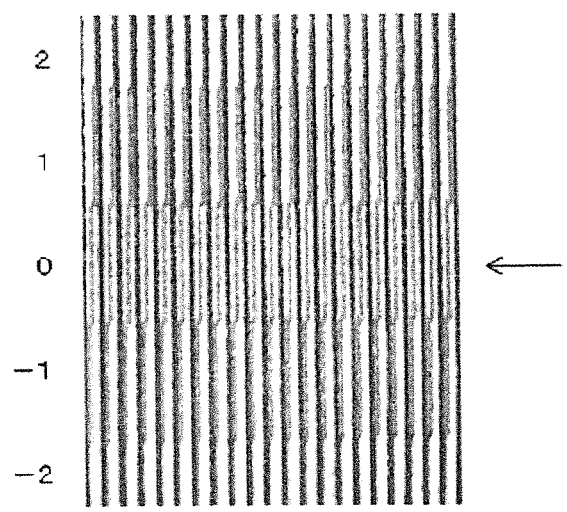

FIGS. 11A and 11B are diagrams illustrating charts actually formed in the multifunction machine 100. FIG. 11A illustrates the state before fine adjustment, and FIG. 11B illustrates the state in the same position as FIG. 11A after the fine adjustment. It may be understood that, while the color of the adjustment color becomes darkest in the position of the adjustment value "+2" in FIG. 11A, the color of the adjustment color becomes darkest in the position of the adjustment value "0" in FIG. 11B.

In addition, while, in an embodiment, a case example has been described where the chart is located in the sub-scanning direction and applied to the fine adjustment of color shift correction in the sub-scanning direction, the above-mentioned chart may also be located in the main scanning direction and applied to the fine adjustment of color shift correction in the main scanning direction. In addition, both the chart for fine adjustment in the main scanning direction and the chart for fine adjustment in the sub-scanning direction may also be formed in the same sheet of paper.

In addition, while, in the above description, an example has been described where the transfer receiving body is a sheet of paper transported on the transfer belt 210, it should be understood that a configuration may also be used where the transfer receiving body is the transfer belt 210 and a toner image formed on the transfer belt 210 is secondarily transferred to a sheet of paper.

Furthermore, while, in the above description, the multifunction machine 100 utilizing the four colors of CMYK has been described, the kinds of colors or the number thereof is arbitrary. In addition, the present invention is not limited to the tandem system, and may also be applied to an arbitrary method where image forming is performed by superimposing images individually formed with respect to individual colors.

As described above, since, in this multifunction machine 100, a configuration is used where the stepped image 502 containing the adjustment color is located between the parallel lines 501 containing the reference color, it is possible to obtain an adjustment value for color shift correction based on the visibility of the stepped image 502 containing the adjustment color between the parallel lines 501 containing the reference color.

Figure 12:
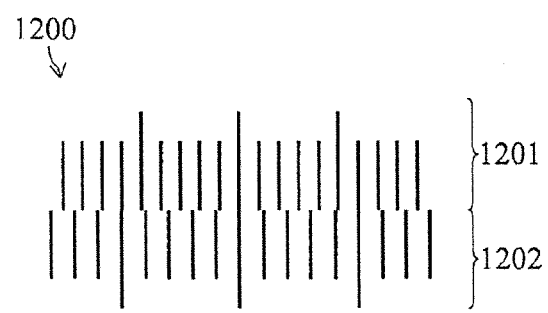
FIG. 12 is a diagram illustrating a chart.

In addition, since a configuration is used where the corresponding pattern is repeatedly disposed, it is possible to visually confirm an adjustment value for the fine adjustment of color shift correction in each stepped image 502 over the entire sheet of paper, and it is possible to easily obtain an adequate color shift adjustment value over the entire sheet of paper. In addition, since the area (in particular, a size in a shift detection direction) of a chart desired to be formed on a sheet of paper so as to obtain one adjustment value in a specified position is smaller than the chart in FIG. 12, it is possible to acquire adjustment values with respect to more positions. As a result, it is possible to acquire a color shift adjustment value with respect to the adjustment color with a higher degree of accuracy, and it becomes possible to realize high-quality image forming.

In addition, the above-mentioned embodiment does not limit the technical scope of the present invention, and in addition to the already described embodiment, various modifications or various applications may occur within the scope of the present invention. For example, while the line widths of the reference color and the adjustment color in the chart are one dot and a distance between the lines of the reference color is five dots (the pitch of the lines of the reference color is six dots), an arbitrary dimension may also be used if being a dimension where a moire occurs. For example, the pitch of a plurality of lines containing the reference color may be set to N (an integer number greater than or equal to 3) times as large as a minimum line width formable by the image forming section 140, and the number of a plurality of lines that have equal line widths and contain the adjustment color may be set to (N−1), the plural lines being disposed between parallel lines containing the reference color.

In addition, while, in the above description, in the stepped image of the adjustment color, lines containing the adjustment color are positioned without being superimposed in a line width direction, the lines may also be positioned so that a portion in the line width direction overlaps. In other words, if, between the parallel lines containing the reference color, equal line width portions in the individual lines containing the adjustment color are positioned with the positions thereof shifted in order, so as to be headed from one of the corresponding parallel lines to the other, an arbitrary shape may be adopted.

Furthermore, while, in the above-mentioned embodiment, the present invention is embodied as a digital multifunction machine, the present invention may be applied to not only digital multifunction machines, but also an arbitrary image forming apparatus such as a printer or a copying machine.

In addition, while, in the above description, a configuration has been described where the multifunction machine serving as an image forming apparatus includes all of the image forming section, the chart creation section, the input section, and the color shift correction section, the multifunction machine may also be configured as an image forming system where individual sections are arbitrarily configured as separated bodies and connected through a network or the like. For example, even if a chart creation apparatus including the function of the above-mentioned chart creation section is configured as a body separated from the image forming apparatus, it is possible to obtain the same advantageous effect as the multifunction machine of the above-mentioned embodiment. In such an image forming system, for example, a common chart creation apparatus may be shared by a plurality of image forming apparatuses.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. An image forming apparatus comprising:
an image forming section configured to include a plurality of image forming units that individually form images of different colors, and perform image forming by superimposing images of two colors individually formed by two of the image forming units;

a chart creation section configured to input, to the image forming section, image data of a chart that includes plural first lines containing a reference color serving as one color of the two colors, the plural first lines being located in parallel at specific intervals, and a stepped image that has plural second lines with equal line widths containing an adjustment color serving as the other color of the two colors, the plural second lines being parallel to the first lines, wherein between the first lines, the second lines are located with positions thereof shifted in order in both width and length direction of the first lines respectively, so as to be headed from one of the first lines to the other in the stepped image;

an input section configured to receive input of an adjustment value that is selected based on the chart formed by the image forming section; and a color shift correction section configured to move, in response to the adjustment value inputted to the input section, an image forming position of the image forming unit forming an image of the adjustment color with respect to an image forming position of the image forming unit forming an image of the reference color in the image forming section.

2. The image forming apparatus according to claim 1, comprising:

an image reading unit configured to read the chart formed by the image forming section and generate the image data of the chart;

an identification section configured to identify a state of the adjustment color in the image data of the chart generated by the image reading unit; and an adjustment value selection section configured to select the adjustment value based on an identification result via the identification section.

3. The image forming apparatus according to claim 2, wherein:

the identification section identifies the states of the adjustment color in a plurality of positions different from one another in the image data of the chart generated by the image reading unit; and the adjustment value selection section selects, as the adjustment value, an average value of adjustment values individually selected based on the identification results in the plural positions identified by the identification section.

4. The image forming apparatus according to claim 1, wherein a pitch of the first lines is N (an integer number greater than or equal to 3) times as large as a minimum line width formable via the image forming section, and the number of the second lines is (N−1).

5. The image forming apparatus according to claim 1, wherein the adjustment value is identified by identifying the position where the adjustment color is dark in the stepped image.

6. An image forming system comprising:

an image forming apparatus configured to include a plurality of image forming units that individually form images of different colors, and perform image forming by superimposing images of two colors individually formed by two of the image forming units; and a chart creation apparatus configured to input, to the image forming apparatus, image data of a chart that includes plural first lines containing a reference color serving as one color of the two colors, the plural first lines being located in parallel at specific intervals, and a stepped image that has plural second lines with equal line widths containing an adjustment color serving as the other color of the two colors, the plural second lines being parallel to the first lines, wherein between the first lines, the second lines are located with positions thereof shifted in order in both width and length direction of the first lines respectively, so as to be headed from one of the first lines to the other in the stepped image, wherein the image forming apparatus includes an image forming section configured to perform the image forming, an input section configured to receive input of an adjustment value that is selected based on the chart formed by the image forming section, and a color shift correction section configured to move, in response to the adjustment value inputted to the input section, an image forming position of the image forming unit forming an image of the adjustment color with respect to an image forming position of the image forming unit forming an image of the reference color in the image forming section.

7. The image forming system according to claim 6, comprising:

an image reading unit configured to read the chart formed by the image forming section and generate the image data of the chart;

an identification section configured to identify a state of the adjustment color in the image data of the chart generated by the image reading unit; and an adjustment value selection section configured to select the adjustment value based on an identification result via the identification section.

8. The image forming system according to claim 7, wherein:

the identification section identifies the states of the adjustment color in a plurality of positions different from one another in the image data of the chart generated by the image reading unit; and the adjustment value selection section selects, as the adjustment value, an average value of adjustment values individually selected based on identification results in the plural positions identified by the identification section.

9. The image forming system according to claim 6, wherein a pitch of the first lines is N (an integer number greater than or equal to 3) times as large as a minimum line width formable via the image forming section, and the number of the second lines is (N−1).

10. The image forming system according to claim 6, wherein the adjustment value is identified by identifying the position where the adjustment color is dark in the stepped image.

11. A color shift correction method comprising:

performing image forming by superimposing images of two colors individually formed by two of a plurality of image forming units, in an image forming section configured to include the image forming units that individually form images of different colors;

inputting, to the image forming section, image data of a chart that includes plural first lines containing a reference color serving as one color of the two colors, the plural first lines being located in parallel at specific intervals, and a stepped image that has plural second lines with equal line widths containing an adjustment color serving as the other color of the two colors, the plural second lines being parallel to the first lines, wherein between the first lines, the second lines are located with positions thereof shifted in order in both width and length direction of the first lines respectively, so as to be headed from one of the first lines to the other in the stepped image;

receiving input of an adjustment value that is selected based on the chart formed by the image forming section; and moving, in response to the input adjustment value, an image forming position of the image forming unit forming an image of the adjustment color in the image forming section with respect to an image forming position of the image forming unit forming an image of the reference color.

12. The color shift correction method according to claim 11, comprising:

reading the chart formed by the image forming section and generating the image data of the chart;

identifying a state of the adjustment color in the image data of the generated chart; and selecting the adjustment value based on the identifying.

13. The color shift correction method according to claim 12, wherein:

the identifying includes identifying the states of the adjustment color in a plurality of positions different from one another in the image data of the generated chart; and the selecting includes selecting, as the adjustment value, an average value of adjustment values individually selected based on the identification results in the identified plural positions.

14. The color shift correction method according to claim 11, wherein a pitch of the first lines is N (an integer number greater than or equal to 3) times as large as a formable minimum line width, and the number of the second lines is (N−1).

15. The color shift correction method according to claim 11, wherein the adjustment value is identified by identifying the position where the adjustment color is dark in the stepped image.

* * * * *